United States Patent

Blom

[11] Patent Number: 6,005,353
[45] Date of Patent: Dec. 21, 1999

[54] COMMUTATOR FOR A DISCHARGE LAMP HAVING MUTUALLY COUPLED INDUCTORS

[75] Inventor: Anton C. Blom, Eindhoven, Netherlands

[73] Assignee: U.S. Philips Corporation, New York, N.Y.

[21] Appl. No.: 09/088,717

[22] Filed: Jun. 1, 1998

[30] Foreign Application Priority Data

Jul. 3, 1997 [EP] European Pat. Off. .............. 97202055

[51] Int. Cl.$^6$ .................................................. H05B 37/02
[52] U.S. Cl. ................ 315/209 R; 315/224; 315/DIG. 5
[58] Field of Search ..................................... 315/291, 307, 315/224, 209 R, DIG. 5, DIG. 7, 219

[56] References Cited

U.S. PATENT DOCUMENTS 5,612,594  3/1997  Maheshwari ............................. 315/224
5,691,603  11/1997  Nilssen ................................... 315/209 R

FOREIGN PATENT DOCUMENTS

0398432A1  11/1990  European Pat. Off. .

Primary Examiner—David H. Vu
Attorney, Agent, or Firm—Bernard Franzblau

[57] ABSTRACT

A circuit arrangement for igniting and operating a discharge lamp is provided with input terminals for connecting a supply source and a commutator having output terminals for connecting a lamp to be operated, the commutator including at least two switches which are alternately in a conducting and a non-conducting state. The commutator is suitable for pulse width modulation (PWM) operation of the switches. The switches and an output terminal are connected to one another by coupled inductors for this purpose.

4 Claims, 2 Drawing Sheets

COMMUTATOR FOR A DISCHARGE LAMP HAVING MUTUALLY COUPLED INDUCTORS

BACKGROUND OF THE INVENTION

1. Field of the Invention

This invention relates to a circuit arrangement for igniting and operating a discharge lamp, provided with input terminals for connecting a supply source, commutator means provided with output terminals for connecting a lamp to be operated, which commutator means comprises at least two (2) switching means which are alternately in a conducting and a non-conducting state, each of the two switching means being connected to a connection point which is connected to one of the output terminals.

2. Description of the Related Art

A circuit arrangement of the kind mentioned in the opening paragraph is known from EP-A-0398432=U.S. Pat. No. 5,087,859. The known circuit arrangement is particularly suitable for operating a high-pressure discharge lamp of a projection TV installation (PTV). An important property of a high-pressure discharge lamp is that acoustic resonances will occur under certain conditions. Such resonances give rise to instabilities in the discharge arc of the lamp, and thus in the light output. In extreme cases, said resonances will lead to instabilities of such an intensity that the lamp extinguishes. The resonances may also give rise to attacks on the discharge vessel of the lamp such that the end of lamp life is reached prematurely. The risk of acoustic resonances occurring is avoided in the known circuit arrangement in that the commutator means are operated at a fixed frequency, which frequency lies within a resonance-free band of the lamp.

The commutator means in the known circuit arrangement is formed by a bridge circuit with four switching means which are interconnected in pairs via respective connection points and which are switched alternately into a conducting and a non-conducting state. The bridge circuit comprises a bridge branch between connection points in which the output terminals for connecting a lamp to be operated are incorporated. To control the power consumed by the lamp, the known circuit arrangement comprises a controlled power stage which supplies a DC voltage to the commutator means. A disadvantage of this is that an additional power stage is required. An alternative mode of power control is a control of the switching frequency of each of the switching means of the commutator means. This is practically impossible in the operation of high-pressure discharge lamps on account of the problem of acoustic resonances as described above. In practice, bridge circuits with two switching means are widely used for operating low-pressure mercury discharge lamps. It is proposed to control the power consumed by the lamp, and thus the luminous flux of the lamp, through a control of the switching frequency of the switching means. It is found to be necessary to increase the switching frequency very strongly compared with that obtaining in nominal operation of the low-pressure mercury discharge lamp if the luminous flux is to be controlled over a wide range in this manner. An important disadvantage of this is that the use of such high switching frequencies leads not only to a quick variation in light intensity (flickering) which is unpleasant to the human eye, but also to a strongly increased intensity of the radio frequency interference (RFI). Although it is possible to counteract the occurrence of radio frequency interference by means of additional, specific interference suppression circuits in addition to usual filter circuit means, the use of such interference suppression circuits leads on the one hand to a considerable power loss and on the other hand to a disadvantageous rise in the cost price owing to a strongly increased complexity of the circuit arrangement.

It is an object of the invention to provide a circuit arrangement of the kind described in the opening paragraph with a control of the power consumed by the lamp in which the above disadvantages are avoided.

SUMMARY OF THE INVENTION

According to the invention, this object is achieved in a circuit arrangement of the kind mentioned in the opening paragraph in that the commutator means is suitable for pulse width modulation (PWM) of the switching means, and in that inductive means are connected between the connection point and each switching means, which inductive means are mutually coupled. An advantage of the circuit arrangement according to the invention is that on the one hand the switching frequency of the commutator means is not influenced by the PWM, and that on the other hand no separate power stage is required for realizing a power control. The inductive means, which are mutually coupled, realize in an advantageous manner that the load current is a current having a pattern of current maxima and current minima which corresponds to the frequency of the commutation, also in the case of low values of the duty cycle of the PWM. The occurrence and effect of higher harmonics are substantially prevented by the inductive means, so that radio frequency interference does not become too high in intensity.

In a circuit arrangement according to the invention, preferably, each of the two switching means is connected to a connection terminal via rectifying means which shunt the coupled induction means and one of the two switching means. Thanks to the rectifying means connected in parallel, an overvoltage of the switching means is prevented in a simple but effective manner.

The circuit arrangement according to the invention is highly suitable for use in commutator means with a bridge circuit comprising two switching means.

BRIEF DESCRIPTION ON THE DRAWINGS

The above and further aspects of the invention will be explained in more detail below with reference to a drawing of an embodiment of the circuit arrangement according to the invention, in which FIG. 1 is a block diagram of a circuit arrangement for igniting and operating a high-pressure discharge lamp according to the invention, FIG. 2 is a detailed diagram of commutator means which form part of the circuit arrangement of FIG. 1, FIG. 3 is a graph showing the load current in the commutator means of FIG. 2, and FIG. 4 is a graph of the load current in a circuit arrangement according to the prior art.

DETAILED DESCRIPTION OF THE INVENTION

Figure 1:
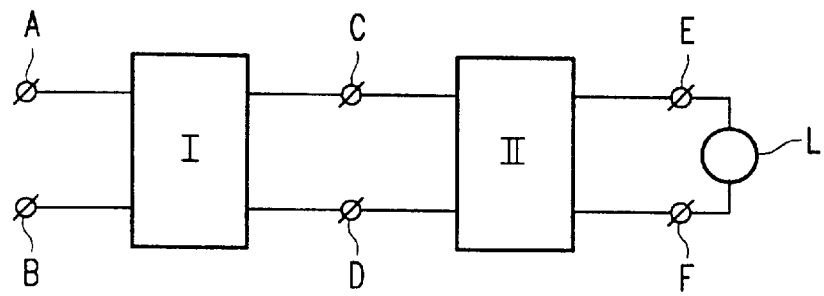

In FIG. 1, A and B are input terminals for connecting a supply source, for example, a public 220 V, 50 Hz AC supply voltage, which terminals are connected to usual filter circuit and rectifying means I for forming a DC voltage at connection terminals C, D. The commutator means II is connected to the connection terminals C, D and is provided with output terminals E, F for connection to a lamp L to be operated. The commutator means in the present embodiment are constructed as a bridge circuit which is shown in more detail in FIG. 2. The bridge circuit comprises two switching means 1, 2 which are alternately in a conducting and a non-conducting state, while each of the two switching means is connected to a connection point M which is connected to one of the output terminals. The bridge circuit further comprises two bridge capacitors 3, 4 with a common junction point N. A bridge branch is present between the connection points M, N, comprising a self-inductance 5 in series with the output terminals E, F and a capacitor 6 parallel to the output terminals E, F. Inductive means 11, 12, mutually coupled, are connected between the connection point M and each of the two switching means 1, 2. The switching means are thus connected to an output terminal by means of respective inductive means which are mutually coupled. Each switching means 1, 2 of the two switching means 1, 2 is connected to a connection terminal by rectifying means, formed by a diode 110, 120, respectively, which shunts the coupled inductive means 11, 12 and one of the two switching means.

Figure 3:
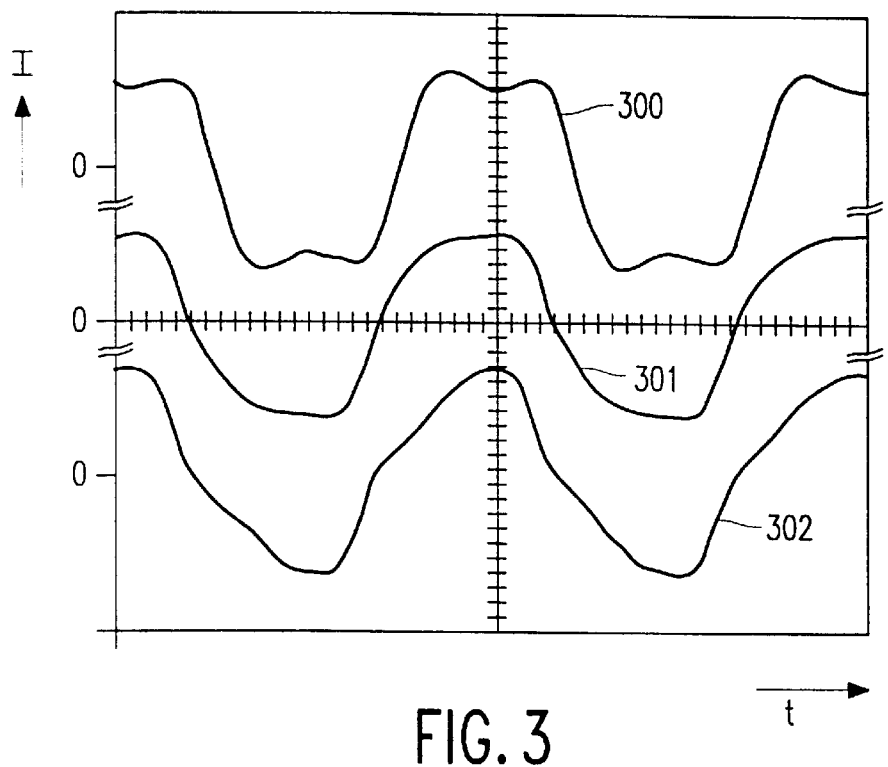
Figure 4:
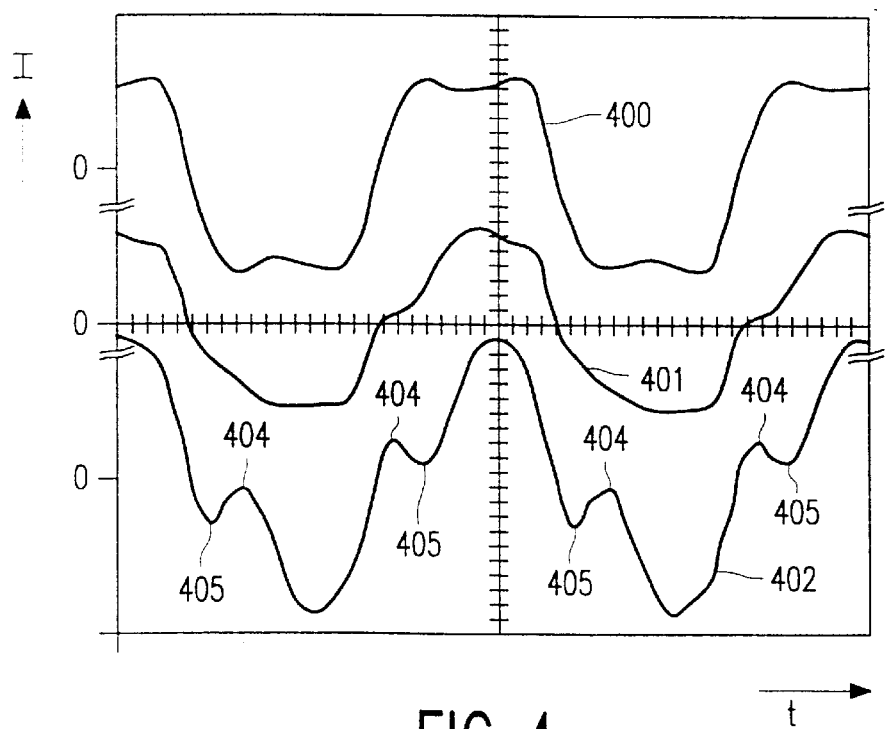

In a practical realization of the embodiment described, the circuit arrangement is designed to be supplied from a 220 V, 50 Hz supply source. The usual filter circuit and rectifying means I transform the input supply to a DC voltage of 300 V at the connection terminals C, D of the commutator means. A high-pressure discharge lamp of the UHP type, make Philips, with a power rating of 100 W is connected to the output terminals of the commutator means. The lamp has a nominal arc voltage of 90 V. The lamp forms part of a PTV installation. The commutation frequency of the commutator means is 22 kHz when the lamp is in its stable operating condition. The switching means 1, 2 are constructed as MOSFETs, type IRFP450FI, make SGS-Thomson. The coupled inductive means 11, 12 are formed by a coil 10 whose ferrite core is provided with two separate windings 11, 12, each with a self-inductance value of 0.5 mH. The self-inductance 5 has a value of 0.5 mH. Capacitor 6 has a value of 22 nF, and the capacitors 3, 4 each have a value of 150 nF. The control of the power consumed by the lamp is aimed at operating the lamp at a constant power so as to realize a constant luminous flux. Variations in the supply voltage level are compensated for by means of the pulse width modulation of the bridge switches. FIG. 3 shows how the load current then varies as a function of time for various values of the supply voltage. In FIG. 3, 300 is a graph representing the load current in the commutator means in the case of non-modulated pulsatory operation (100% pulse width) and with a supply source voltage level of 200 V. The current I is plotted on the vertical axis, the time t on the horizontal axis. 301 and 302 represent the load currents at 80% pulse width and 70% pulse width, respectively. This corresponds to voltage values of the supply source of 230 V and 260 V, respectively. It is apparent from the Figure that the load current, also in the case of a strongly modulated pulse width at a constant frequency, has a pattern of current maxima and minima which corresponds to this frequency only. For comparison, FIG. 4 contains curves 400, 401, and 402 representing the load currents occurring during operation of the lamp at a constant power at various voltage values of the supply source, i.e. of 200, 230, and 260 V, while the commutator means is not provided with coupled inductive means which interconnect the switching means and an output terminal. With non-modulated pulses (100% pulse width), it is clear from a comparison between curve 300 and curve 400 that similar load currents occur. The coupled inductive means do not appreciably influence the operation of the commutator means under these circumstances. However, when the pulse width is below 100%, the load current is found to show an increasing high-frequency deformation in proportion as the pulse width decreases, as is apparent from comparisons between curves 301 and 401, and between curves 302 and 402, which results in a number of relative current maxima 404 and minima 405. The curve 401 corresponds to a pulse width of 60%, and the curve 402 to one of 50%. The increasing number of higher frequencies in the load current involves the risk of acoustic resonances occurring. The relative current maxima 404 and minima 405 may also lead to additional zero passages of the current, involving the possibility of the switching means switching into the conductive state under capacitive load conditions, which may easily lead to a destruction of the switching means.

Figure 2:
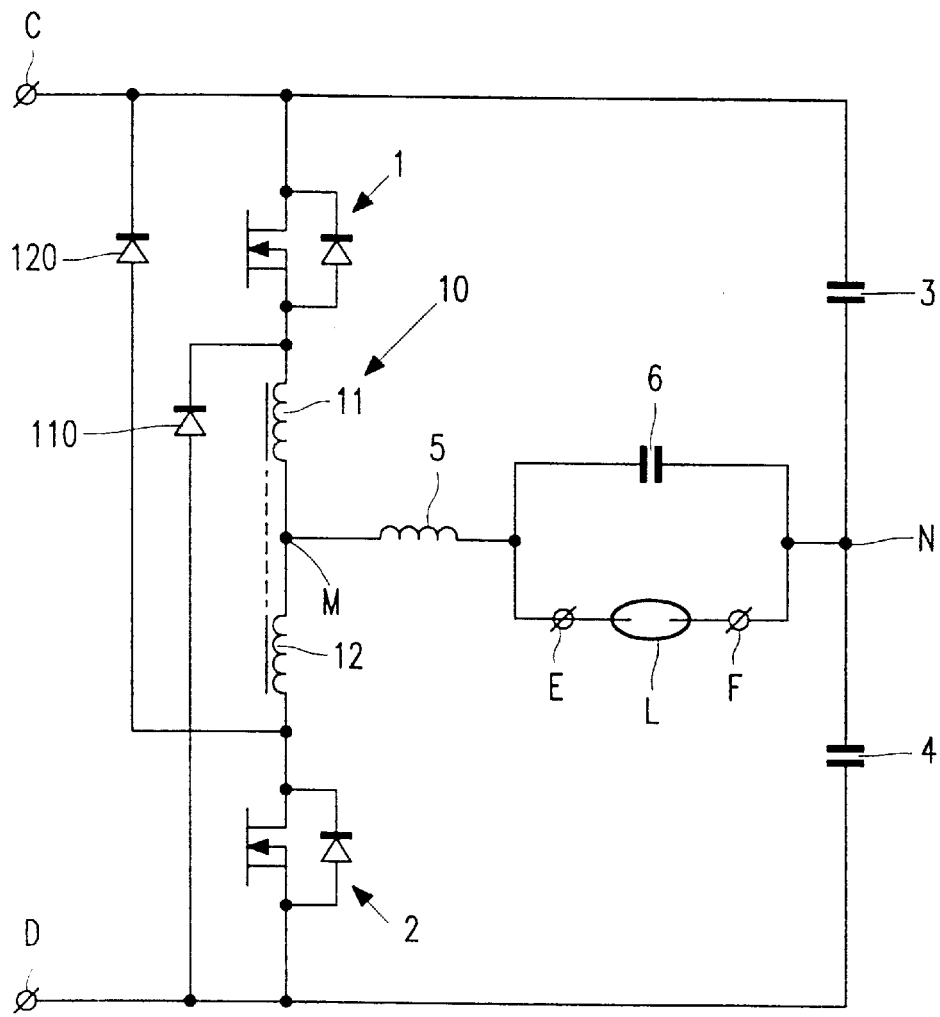

In a further practical realization of the circuit arrangement according to the invention as described with reference to FIG. 2, this arrangement is suitable for igniting and operating a low-pressure mercury discharge lamp of the TLD58W type, make Philips, with a power rating of 58 W. The separate windings 11, 12 here each has a value of 3 mH, self-inductance 5 a value of 1 mH, capacitor 6 a capacitance value of 12 nF, and the capacitors 3, 4 each a value of 150 nF. The commutation frequency of the commutator means is 22 kHz. It is found to be possible by means of the circuit arrangement to control the luminous flux of the lamp between its nominal value and a value equal to 3% of the nominal value, during which the luminous intensity shows no flickering visible to the human eye, and the intensity of interference radiation hardly increases at all compared with nominal lamp operation.

I claim:

1. A circuit arrangement for igniting and operating a discharge lamp, provided with input terminals for connecting a supply source, a commutator means provided with output terminals for connecting the lamp to be operated, which commutator means comprises at least two switching means which are alternately in a conducting and a non-conducting state, each of the two switching means being connected to a connection point which is connected to one of the output terminals, characterized in that the commutator means is suitable for pulse width modulation (PWM) of the switching means, and in that inductive means are connected between the connection point and each switching means, which inductive means are mutually coupled magnetically.

2. A circuit arrangement as claimed in claim 1 characterized in that the commutator means is formed by a bridge circuit comprising two the switching means.

3. A circuit arrangement for igniting and operating a discharge lamp, provided with input terminals for connecting a supply source, a commutator means provided with output terminals for connecting the lamp to be operated, which commutator means comprises at least two switching means which are alternately in a conducting and a non-conducting state, each of the two switching means being connected to a connection point which is connected to one of the output terminals, characterized in that the commutator means is suitable for pulse width modulation (PWM) of the switching means, and in that inductive means are connected between the connection point and each switching means, which inductive means are mutually coupled, and characterized in that each of the two switching means is connected to a connection terminal via rectifying means which shunt the coupled induction means and one of the two switching means.

4. A circuit arrangement for igniting and operating a discharge lamp, provided with connection terminals for connection to a DC voltage source, a commutator means provided with output terminals for connecting the lamp to be operated, which commutator means comprises two switching means, each switching means having a current path that is alternately in a conducting and a non-conducting state and connects a respective one of the connection terminals to a common connection point, the common connection point being connected to one of the output terminals, characterized in that the commutator means is suitable for pulse width modulation (PWM) of said current paths by the two switching means, and in that an inductive means is series connected in each of said current paths to prevent acoustic resonances, said inductive means being mutually coupled magnetically.

* * * * *